United States Patent
Gossett et al.

(12) 
(10) Patent No.: US 6,236,413 B1
(45) Date of Patent: May 22, 2001

(54) METHOD AND SYSTEM FOR A RISC GRAPHICS PIPELINE OPTIMIZED FOR HIGH CLOCK SPEEDS BY USING RECIRCULATION

(75) Inventors: Carroll Philip Gossett, Mountain View; Vimal S. Parikh, Fremont; Nancy Cam Winget, Mountain View, all of CA (US)

(73) Assignee: Silicon Graphics, Inc., Mountain View, CA (US)

(*) Notice: Subject to any disclaimer, the term of this patent is extended or adjusted under 35 U.S.C. 154(b) by 0 days.

(21) Appl. No.: 09/134,169

(22) Filed: Aug. 14, 1998

(51) Int. Cl.$^7$ .............................. G06T 1/20; G06T 15/60
(52) U.S. Cl. ...................... 345/506; 345/426; 345/430
(58) Field of Search .................... 345/501–506, 345/522, 418, 419, 426, 430

(56) References Cited

U.S. PATENT DOCUMENTS

| 5,742,749 | * | 4/1998 | Foran et al. | 345/426 |
| 5,831,640 | * | 11/1998 | Wang et al. | 345/521 |
| 5,977,977 | * | 11/1999 | Kajiya et al. | 345/418 |
| 6,016,150 | * | 1/2000 | Lengyel et al. | 345/426 |

OTHER PUBLICATIONS

Eyles, J. et al., "PixelFlow: The Realization", Proceedings of the 1997 SIGGRAPH/Eurographics Workshop on Graphics Hardware, 1997, pp. 57–68.*

Lengyel, J. et al., "Rendering With Coherent Layers", Proceedings of the 24th Annual Conference on Computer Graphics & Interactive Techniques, 1997, pp. 233–242.*

McCool, M. et al., "Texture Shaders", Proceedings of the 1999 Eurographics/SIGGRAPH Workshop on Graphics Hardware, 1999, pp. 117–126.*

Montrym, J. et al., "InfiniteReality: A Real–Time Graphics System", Proceedings of the 24th Annual Conference on Computer Graphics & Interactive Techniques, 1997, pp. 293–302.*

Torborg, J. et al., "Tailsman: Commodity Realtime 3D Graphics for the PC", Proceedings of the 23rd Annual Conference on Computer Graphics, 1996, pp. 353–363.*

Winner, S. et al., "Hardware Accelerated Rendering of Antialiasing Using A Modified A–buffer Algorithm", Proceedings of the 24th Annual Conference on Computer Graphics & Interactive Techniques, 1997, pp. 307–316.*

* cited by examiner

*Primary Examiner*—Ulka J. Chauhan
(74) *Attorney, Agent, or Firm*—Wagner, Murabito & Hao LLP

(57) ABSTRACT

In a computer system including a processor coupled to a memory via a bus, a system for a reduced instruction set graphics processing subsystem. The graphics processing subsystem is configured to accept graphics data from a computer system via a bus. The graphics processing subsystem is deeply pipelined to achieve high bandwidth, and is operable for processing graphics data including a first and second set of graphics instructions. The graphics instructions from the second set are more complex than the graphics instructions from the first set. The graphics processing subsystem also includes a built-in recirculation path for enabling the execution of graphics instructions by multi-pass. The graphics pipeline is streamlined such that the graphics instructions from the first set are processed efficiently. The graphics instructions from the second set are processed by using multi-pass via the recirculation path. By being optimized for the first set of graphics instructions, the graphics pipeline is able to run at very high clock speeds, thereby increasing its aggregate bandwidth.

17 Claims, 17 Drawing Sheets

Table 1: Texture Filter Multipass

| $C_t$ | Control | Description |
|---|---|---|
| Undef | TFD | Disable Texture filter |
| Tex[s,t,r] | TFF | First pass of filter4 operation |
| Tex[s,t,r] + $C_{tr}$ | TFR | Second pass of filter4 operation. Uses $C_{tr}$ |
| $C_{tr}$ | TFI | Pass recirculation color to output |

FIG. 3

Table 2: Texture Filter Recirculation Input

| Ctr | Control | Description |
|---|---|---|
| Ct | TFCT | Recirculate Texture filter color |
| Ctr | TFCTR | Recirculate the same color |

FIG. 4

Table 3: Texture Environment Controls

| $C_{te}$ | Control | Description |
|---|---|---|
| $C_f$ | TED | Texture Environment is Disabled |
| $C_f <OP> C_t$ | TEF | Single texture pass or first multitexture pass |
| $C_{ter} <OP> C_t$ | TER | Second pass of Multitexture |
| $C_{ter}$ | TEI | Pass recirculation color to output |

FIG. 5

Table 4: Texture Environment Recirculation Input

| Cter | Control | Description |
|------|---------|-------------|
| Cte  | TECTE   | Recirculate texture environment color |
| Cter | TECTER  | Recirculate the same color |

FIG. 6

Table 5: Lighting Attenuation Controls

| Atten | Control | Description |
|---|---|---|
| $ATTN_l$ | LAC | Compute Spotlight attenuation only |
| $ATTN_f$ | LAF | Use interpolated Attenuation |
| $ATTN_r$ | LAR | Use recirculated Attenuation |

FIG. 7

Table 6: Lighting Environment Controls

| $C_{le}$ | Control | Description |
|---|---|---|
| $C_f$ | LEC | Disabled. Pass $C_f$ to output |
| $C_{te}$ | LET | Disabled. Pass $C_{te}$ to output |
| $C_{te}$ <OP> $C_l$ | LEF | First Light pass (single/multi Light case) |
| $C_{te}$ <OP> $(C_l + C_{ler})$ | LER | Second Light thru Final Light pass (multi Light case) |
| $C_{te}$ <OP> $C_{ler}$ | LEI | Idle. Multipass case when either TF or TE are busy (single/multi Light case) |

FIG. 8

Table 7: Filter4 Passes

| Pass | Description |
|---|---|
| TFF | Set Texture filter parameters for 1st pass. Interpolate s,t,r |
| TFR | Set Texture filter parameters for 2nd pass. Interpolate s,t,r |

FIG. 9

Table 8: Projective Texture Passes

| Passes | Description |
|---|---|
| Single Color Texture | |
| TFF, TED | Interpolate (s,t,r,q/w) and compute texture color |
| TFI, TEF | Set Texture filter to pass $C_{tr}$. Interpolate r,g,b,z and combine with texture color |
| 2 Color Textures (either one or both are projective textures) | |
| TFF, TED | Interpolate (s,t,r,q/w) for Texture1 |
| TFI, TEF | Interpolate (r,g,b,a) and combine with texture color |
| TFF, TER | Interpolate (s,t,r,q/w) for Texture2. Combine with recirculated color |
| TFD, TEI | Interpolate (r,g,b,z) and pass the recirculated color |

FIG. 10

Table 9: Multiple Texture Passes

| Pass | Description |
|---|---|
| 2 Color Textures (non-projective) | |
| TFF, TEF | Interpolate (r,g,b,z,s,t,r, 1/w) for Texture1. Compute texture color and combine with interpolated color |
| TFF, TER | Interpolate (z,s,t,r,1/w) for Texture2. Compute texture color and combine with recirculated color |
| 1 Color Texture + 1 Normal Texture (non projective) | |
| TFF, TEF | Interpolate (r,g,b,z,s,t,r,1/w) for Texture1. Compute texture color and combine with interpolated color |
| TFF, TEF | Interpolate (z,s,t,r,1/w) for Texture2. Compute texture normal. Pass through the TE (Texture Environ mode must be set properly) |

FIG. 11

Table 10: Multiple Lighting Passes

| Pass | Description |
|---|---|
| LEF | Interpolate (theta, n-h, atten) for light1. Pass computed color |
| LER | Interpolate (theta, n-h, atten) for light2. Combine with recirculated color |
| LER | Interpolate (theta, n-h, atten) for lightN. Add light color to recirculated color and combine with texture/fragment color |

FIG. 12

Table 11: Spot Light Passes

| Pass | Description |
|---|---|
| LAC | Interpolate (1-s, attn). Compute spot light attenuation |
| LAR | Interpolate (theta, n·h) and use recirculated attenuation |

FIG. 13

Table 12: Separate Specular Color Passes

| Passes | Description |
|---|---|
| TEF | Combine texture color with interpolated color (emis+amb+diff) |
| TEF | Set mode bits (Separate_specular_color)<br>Set texture environment op = ADD<br>Set texture environment bias = 0<br>Add texture environment color from first pass with interpolated color (spec) |

FIG. 14

Table 13: Multipass Raster Tokens

| Token | Field | # bits | Enum | Description |
|---|---|---|---|---|
| en_others | mp_tex_filt1 | 2 | 00:TFD<br>01:TFF<br>10:TFR<br>11:TFI | Filter Idle<br>Texture Color. First pass<br>Second Pass of Filt4<br>Pass Recirc. color |
| | mp_tex_filt2 | 1 | 0:TFCT<br>1:TFCTR | Recirc. Texture color<br>Recirc. the same color |
| | mp_tex_env1 | 2 | 00:TED<br>01:TEF<br>10:TER<br>11:TEI | Pass Fragment Color<br>Tex. Env: Frag. & Tex. Color<br>Tex. Env: Tex. & Recirc. Color<br>Pass Recirc. Color |
| | mp_tex_env2 | 1 | 0:TECT<br>1:TECTR | Recirc. Tex. Env. Color<br>Recirc. the same color |
| | mp_lgt_env | 3 | 000:LEC<br>001:LET<br>010:LEF<br>011:LER<br>101:LEI | Pass Frag. Color to output<br>Pass Tex. Env. Color to output<br>First pass of single/multi light case<br>Intermediate/last light passes<br>Idle |
| | mp_lighting | 2 | 00:LAF<br>01:LAC<br>10:LAR | Use interpolated attenuation<br>Compare spot-light attenuation<br>Use recirculated attenuation |
| | sep_spec_color | 1 | 0:OFF<br>1:ON | No separate specular color<br>Use separate specular color<br>(Sets TexEnv op to ADD<br>Sets TexEnv Bias to 0) |

FIG. 15A

Table 13: Multipass Raster Tokens (Continued)

| Token | Field | # bits | Enum | Description |
|---|---|---|---|---|
| lgt_env_token | lgt_env | 3 | 000:NONE<br>001:RPLC<br>010:MOD<br>011:ADD | Pass through fragment color<br>Replace frag. color w/light color<br>Modulate frag. color<br>Add light color to frag. color |
| | nrm_src | 2 | 00:TEX0<br>01:TEX1<br>10:NORM | Use normals from Texture 0<br>Use normals from Texture 1<br>Use interpolated normals |
| | [f,b]mat_shn<br>[f,b]mat_emis<br>[f,b]mat_amb<br>[f,b]mat_diff<br>[f,b]mat_spec | 2<br>2<br>2<br>2<br>2 | 00:TEX0<br>01:TEX1<br>10:MAT<br>11:FRAG | Use Texture 0 Colors<br>Use Texture 1 Colors<br>Use material colors<br>Use pre_texture Fragment Colors |
| light_token | amb_src<br>diff_src<br>spec_src<br>attn_src | 2<br>2<br>2<br>2 | 00:TEX0<br>01:TEX1<br>10:LIGHT | Use Texture 0 colors<br>Use Texture 1 colors<br>Use light colors/interpolated attn |

FIG. 15B

METHOD AND SYSTEM FOR A RISC GRAPHICS PIPELINE OPTIMIZED FOR HIGH CLOCK SPEEDS BY USING RECIRCULATION

FIELD OF THE INVENTION

The field of the present invention pertains to computer implemented graphics. More particularly, the present invention relates to a system and method for implementing complex operations in a streamlined high speed graphics pipeline of a computer graphics system.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices.

Graphics have also become a key technology for communicating ideas, data, and trends in most areas of commerce, science, and education. Until recently, real time user interaction with three dimensional (3D) models and pseudo-realistic images was feasible on only very high performance workstations. These workstations contain dedicated, special purpose graphics hardware. The progress of semiconductor fabrication technology has made it possible to do real time 3D animation, with color shaded images of complex objects, described by thousands of polygons, on powerful dedicated rendering subsystems. The most recent and most powerful workstations are capable of rendering completely life-like, realistically lighted, 3D objects and structures.

In a typical 3D computer generated object, the surfaces of the 3D object are described by data models. These data models store "primitives" (usually mathematically described polygons and polyhedra) that define the shape of the object, the object attributes, and the connectivity and positioning data describing how the objects fit together. The component polygons and polyhedra connect at common edges defined in terms of common vertices and enclosed volumes. The polygons are textured, Z-buffered, and shaded onto an array of pixels, creating a realistic 3D image.

In a typical graphics computer, most of the actual rendering computation is performed by a graphics subsystem included in the graphics computer. The 3D object data models are "traversed" by a software program (e.g., in response to user input) running on one or more processors in a processor subsystem within the graphics computer. The primitives describing the 3D object are processed by the processor subsystem and sent to the graphics subsystem for rendering. For example, a 3D polyhedra model of an object is sent to the graphics subsystem as contiguous strips of polygons, sent to the graphics subsystem as a graphics data stream (e.g., primitives, rendering commands, instructions, etc.). This graphics data stream, sometimes referred to as a command data stream, provides the graphics subsystem with all the information required to render the 3D object and the resulting scene. Such information includes, for example, specular highlighting, anti-aliasing, depth, transparency, and the like. Using this information, the graphics subsystem performs all the computational processing required to realistically render the 3D object. The hardware of the graphics subsystem is specially tuned to perform such processing quickly and efficiently in comparison to the processor subsystem.

To facilitate fast and efficient graphics processing, typical graphics subsystems are deeply pipelined. This refers to the architecture of the graphics subsystem wherein the graphics processing hardware includes many different stages for processing graphics data and commands. The large number of stages are sequenced and linked such that at any given instant, several data items or commands are being processed. Each stage is optimized to perform specific task. When it completes its task, another graphics command or data item is ready for processing. In this manner, commands and data proceed down the stages of the pipeline in "assembly line" fashion, at much faster speeds than possible with non-pipelined processing hardware. A modern, deeply pipelined, graphics processing subsystem can run at clock speeds of 266 MHz or more, processing enormous amounts of data.

However, even these speeds are not sufficient for the most demanding 3D applications currently being envisioned. Such applications require the traversal of very large data models and the generation, display, and interaction with highly complex 3D objects, often in real-time. A partial list of such applications include the generation of special effects for movies, real-time engineering design simulations, weather prediction, high fidelity virtual reality, computational fluid dynamics, medical diagnostic imaging, etc. The need for traversing very large data models and processing the resulting graphics data requires that vast amounts of data be processed at extremely fast speeds.

Thus, what is required is a method and system which effectively provides for greatly increased graphics subsystem bandwidth. What is required is a method and system which accommodates the enormous bandwidth requirements of the most demanding 3D visualization applications. What is further desired is a method of servicing the bandwidth requirements of the above applications efficiently, without a large amount of redundant logic, while retaining the ability to perform complex graphics operations. The required system should leverage existing processing hardware of 3D graphics subsystems to improve cost effectiveness. The method and system of the present invention provides a novel solution to the above requirements.

SUMMARY OF THE INVENTION

The present invention is a method and system which effectively provides for greatly increased graphics subsystem bandwidth. The present invention provides a system which accommodates the enormous bandwidth requirements of the most demanding 3D visualization applications. In addition, the present invention provides a method and system for servicing the bandwidth requirements of the above applications efficiently, without a large amount of redundant logic and its attendant expense. The system of the present invention leverages existing processing hardware of 3D graphics subsystems to improve cost effectiveness.

In one embodiment, the present invention comprises a reduced instruction set graphics processing subsystem in a graphics computer system. The instruction set is reduced in that the hardware of the graphics processing subsystem is optimized to execute a subset of the available graphics instructions (e.g., OpenGL v1.1) in a very efficient, streamlined manner. Instructions from this subset execute in a single pass through the multistage pipeline of the graphics subsystem. These instructions are the more simple, more frequently used instructions.

In accordance with the present invention, The more complex instructions are not "directly" implemented in hardware in a single pass. These instructions are implemented by passing the operation through the pipeline multiple times, accomplishing multiple passes. With each pass, the intermediate results are processed, until the complex instruction is completed.

Multi-pass processing is implemented through the use of recirculation pipes built into the components of the graphics processing subsystem. For example, in the case of a texture-shader subsystem, the subsystem's internal components, such as the texture filter unit, the texture environment unit, the per-pixel lighting unit, the light environment unit, and the like, each have a respective recirculation pipe. The recirculation pipes enable the intermediate results of complex operations to be fed back for additional processing. The same recirculation pipes are used to handle pipeline stalls due to, for example, cache faults in the texture-shader subsystem's coupled cache.

Since the hardware does not have to directly support complex operations, the hardware can be streamlined and optimized to execute the simple operations at maximum speed, thus, making the graphic pipeline hardware very efficient. This enables the fast execution of complex instructions, even though they require multiple passes. In this manner, the present invention services the high bandwidth requirements of demanding 3D visualization applications without a large amount of redundant hardware and its attendant expense.

BRIEF DESCRIPTION OF THE DRAWINGS

The present invention is illustrated by way of example and not by way of limitation, in the figures of the accompanying drawings and in which like reference numerals refer to similar elements and in which:

FIG. 3 shows table 1 which defines particular controls, TFD, TFF, TFR, and TFI in accordance with one embodiment of the present invention.

FIG. 4 shows table 2 which defines the controls for input to the texture filter unit recirculation pipe in accordance with one embodiment of the present invention.

FIG. 5 shows table 3 which defines the data path and defines controls for the texture environment unit in accordance with one embodiment of the present invention.

FIG. 6 shows table 4 which defines the controls of a multiplexer which controls the flow of data through one recirculation pipe of the present invention.

FIG. 7 shows table 5 which defines the controls for a per-pixel lighting unit in accordance with one embodiment of the present invention.

FIG. 8 shows table 6, defining the controls for the light environment function in accordance with one embodiment of the present invention.

FIG. 9 shows table 7 describing the controls used in filter4 mode in accordance with one embodiment of the present invention.

FIG. 10 shows table 8 describing the passes needed for implementation of projective texture mode in accordance with one embodiment of the present invention.

FIG. 11 shows table 9 describing the pass required for implementing a multi-texture extension in accordance with one embodiment of the present invention.

FIG. 12 shows a table 10 which describes the passes required for implementing multiple lights in accordance with one embodiment of the present invention.

FIG. 13 shows which describes the passes required for implementing multiple lights in accordance with one embodiment of the present invention.

FIG. 14 shows table 12 describing the passes required for implementing a separate specular color from the vertex lighting in accordance with one embodiment of the present invention.

FIG. 15A shows a first portion of table 13 which describes the tokens and enumerations in accordance with one embodiment of the present invention.

FIG. 15B shows a second portion of table 13, which continues to described the tokens and enumerations in accordance with one embodiment of the present invention.

DETAILED DESCRIPTION OF THE INVENTION

Figure 1:
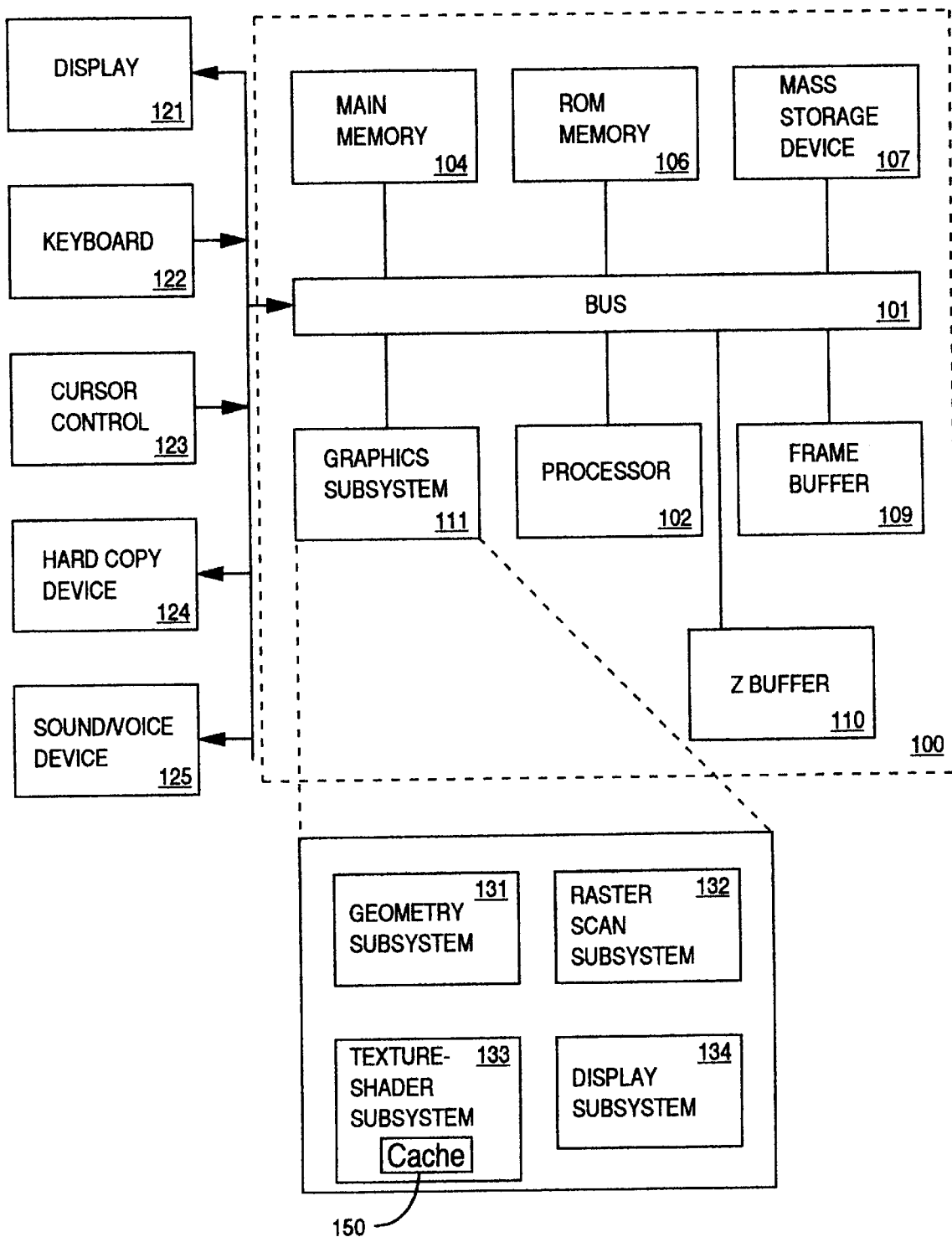
FIG. 1 shows a graphics computer system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to the these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not unnecessarily to obscure aspects of the present invention.

The present invention is a method and system which effectively provides for greatly increased graphics subsystem bandwidth. The present invention provides a system which accommodates the enormous bandwidth requirements of the most demanding 3D visualization applications. In addition, the present invention provides a method and system for servicing the bandwidth requirements of the above applications efficiently, without a large amount of redundant logic and its attendant expense, while retaining the ability to perform complex graphics operations. The system of the present invention leverages existing processing hardware of 3D graphics subsystems to improve cost effectiveness. The present invention and its benefits are further described below.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "processing" or "calculating" or "integrating" or "matching" or "indexing" or "storing" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

FIG. 1 shows a 3D graphics computer system 100 upon which the present invention may be practiced. System 100 includes any computer controlled graphics systems for generating complex or 3 dimensional images. Computer system 100 includes a bus 101 for transmitting digital information between the various parts of the computer system. One or more microprocessors 102 are coupled to bus 101 for processing information. The information along with the instructions of how the information is to be processed are stored in a hierarchical memory system comprised of mass storage device 107, read only memory 106, main memory 104, and static random access memory (SRAM) 103. Mass storage device 107 is used to store vast amounts of digital data. The mass storage device 107 can consist one or more hard disk drives, floppy disk drives, optical disk drives, tape drives, CD ROM drives, or any number of other types of storage devices having media for storing data digitally. A read only memory (ROM) 106 is used to store digital data of a permanent basis, such as instructions for the microprocessors. Main memory 104 is used for storing digital data on an intermediate basis. Main memory 104 can be dynamic random access memory (DRAM).

A 3D graphics rendering system 111 is an option which can be included in system 100. Processor 102 provides the graphics system 111 with graphics data, such as drawing Commands, coordinate vertex data, and other data related to an object's geometric position, color, texture, shading, and other surface parameters. The object data is processed by graphics system 111 in the following four pipelined stages: geometry subsystem 131, raster scan subsystem 132, texture-shader subsystem 133, and a display subsystem 134. The geometry subsystem 131 converts the graphical data from processor 102 into a screen coordinate system. It is the function of the geometry subsystem 131 to perform the projection and transformation process to give depth to a displayed object. The resulting primitives (points, lines, polygons, polyhedra, and the like) supplied by the geometry subsystem 131 are then supplied to the raster scan subsystem 132. It is the function of the raster scan subsystem 132 to then generate pixel data (e.g., fragments, fragment parameters, color information, and the like) based on these primitives. The raster scan subsystem 132 performs the interpolation functions to interpolate straight lines so that each intermediate value need not be individually and separately calculated by the geometry subsystem. Next, the pixel data is sent to the texture-shader subsystem 133, whereupon Z-buffering, blending, texturing, and antialiasing functions are performed. The resulting pixel values are subsequently stored in frame buffer 109, and the Z values are stored in the Z buffer 110. The display subsystem 134 reads the frame buffer 109 and displays the image on monitor 121. To maximize the flow of data through graphics rendering system 111, a plurality of data caches, such as, for example cache 150 within texture-shader subsystem 133, are included within the components of graphics rendering system 111.

Several other devices may also be coupled to system 100. For example, an alphanumeric keyboard 122 is used for inputting commands and other information to processor 102. Another type of user input device is cursor control device 123 (a mouse, trackball, joystick, and the like) used for positioning a movable cursor and selecting objects on a computer screen. Another device which may be coupled to bus 101 is a hard copy device 124 (e.g., a laser printer) for printing data or other information onto a tangible medium. Additionally, a sound recording or video option 125 can be coupled to the system 100 to provide multimedia capabilities.

Figure 2:
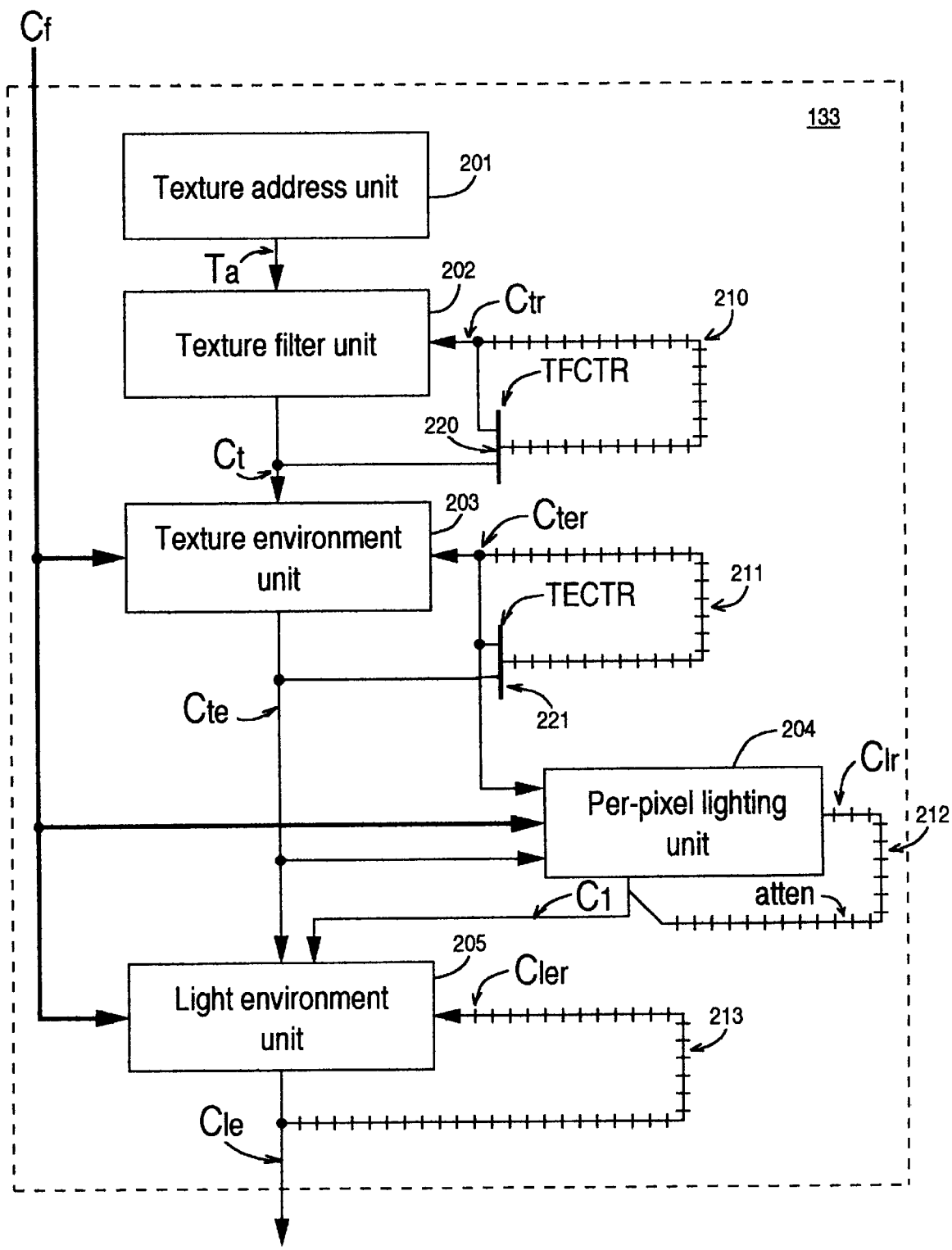
FIG. 2 shows a diagram of a graphics pipeline in accordance one embodiment of the present invention.

Referring now to FIG. 2, a diagram showing components a texture-shader subsystem 133 in accordance with one embodiment of the present invention is shown. As shown in FIG. 2, texture-shader subsystem 133 includes the following components: a texture address unit 201, a texture filter unit 202, a texture environment unit 203, a per-pixel lighting unit 204, and a light environment unit 205.

In accordance with the present invention, the texture filter unit 202, texture environment unit 203, per-pixel lighting unit 204, and light environment unit 205 are each coupled to a respective recirculation pipe, recirculation pipes 210 through 213, as shown.

Referring still to FIG. 2, texture address unit 201 outputs texture addresses, Ta, to texture filter unit 202. Texture filter unit 202 generates a texture filter color, Ct, which is coupled to texture environment unit 203. Texture environment unit generates a texture environment color, Cte, and couples Cte to both the per-pixel lighting unit 204 and the light environment unit 205. Per-pixel lighting unit 204 generates a per-pixel light color, Cl, and couples Cl to light environment unit 205. Light environment unit 205 receives both Cl and Cte and generates a light environment color, Cle, which is subsequently provided to the display subsystem 134 (shown in FIG. 1) for rendering.

Components 201–205 of texture-shader subsystem 133 are implemented in a deeply pipelined fashion in order to maximize the rate at which graphics data is processed and output. Recirculation pipes 210 through 213 function in part by recirculating data from their respective component when the flow of data through texture-shader subsystem is interrupted. Such an interruption occurs when, for example, a cache fault occurs in cache 150 (shown in FIG. 1) and needed data needs to be fetched from main memory 104. Since graphics subsystem 111 operates at such high clock speeds, rather than stop the clock (e.g., by gating, etc.) the data is simply recirculated through each of recirculation pipes 210–213. As a result, recirculation pipes 210–213 are identical in length and width. For example, in the present embodiment, recirculation pipes 210–212 are each 88 stages long and 48 bits wide (except for the lighting which is only 8 bits wide). Accordingly, recirculation pipe 210 provides recirculated texture filter color, Ctr, to texture filter unit 202, recirculation pipe 211 provides recirculated texture environment color, Cter, to texture environment unit 203, recirculation pipe 212 provides recirculated per-pixel light color, Clr, to per-pixel lighting unit 204, and recirculation pipe 213 provides recirculated light environment color, Cler, to color environment unit 205. Recirculation pipes 210 and 211 include multiplexers 220 and 221 which control the circulation of data through their respective pipes. U.S. patent application Ser. No. 09/048,099 "A METHOD FOR EFFICIENT HANDLING OF TEXTURE CACHE MISSES BY RECIRCULATION" by Gosset et al. filed Mar. 26, 1998, describes the use of recirculation to solve the problem of texture cache misses, and is herein incorporated by reference.

However, in addition to minimizing the cost of a pipeline stall (e.g., due to a cache fault), recirculation pipes 210–213 are used by texture-shader subsystem 133 to implement complex graphics operations by using a "multi-pass" operation. The multi-pass operation involves the recirculation of data through one or more of recirculation pipes 210–213 in order to perform iterative processing on the data, thereby implementing more complex operations than possible in a "single" pass.

Thus, in accordance with the present invention, this allows the designs of components 201–205 to be optimized for maximum speed with regard to a smaller simpler subset of the graphics commands used by graphics subsystem 111. The more simple graphics commands (e.g., OpenGL 1.1) are typically the most often used graphics commands. The hardware of components 201–205 is optimized to execute these instructions as fast as possible. The hardware is thus, more simple and more streamlined, in comparison to hardware designed for implementing a complete instruction set, including the complex graphics instructions as well as the simple graphics instructions. Consequently, the targeted simple instructions execute extremely fast. The more complex, less frequently used graphics commands are supported through the use of multi-pass operations, wherein the data is recirculated back through the recirculation pipes 210–213 for incremental processing. Hence, texture-shader subsystem 133 is an example of one component of a reduced instruction set graphics subsystem in accordance with the present invention.

For example, the multi-pass operation of texture-shader subsystem 133 can be used to implement advanced shading functionality. Recirculation pipes 210–213 allow the iterative reuse of components 201–205 to accomplish the advanced shading algorithms. In accordance with the present invention, multi-pass operations are achieved by configuring the components 201–205 differently in each pass. Texture-shader subsystem 133 includes a master scheduler (not shown) which controls each pass. The application software (e.g., executing on processor 102) issues configuration and data commands for each pass. The set of graphics commands and algorithms for generating the specific micro-operations (e.g., raster tokens) for multi-pass operations in accordance with the present invention are described in greater detail in the discussions, tables, and Figures which follow.

With reference still to FIG. 2, as described above, recirculation pipes 210–213 are respectively coupled to components 202–205. As described above, recirculation pipes 210–213 are of equal length and are each 48 bits wide, however, except for the lighting which is only 8 bits wide. Each can recirculate a 4 component, 12 bit color (or other equivalent quantity). These recirculating pipes are what makes multi-passing possible. At any time, three different color values could be recirculating in the components 201–205. The main pixel pipes between each of components 201–205 carry the result of the output from each component (e.g., texture filter unit 202) to the next component (e.g., texture environment unit 203). The input to the recirculating pipes 210–213 can come from either the output of that component or from the output of the recirculating pipe. This allows the texture-shader subsystem 133 to recirculate a pixel color indefinitely. The output from the end of a recirculation pipe is used in the component operations depending upon the modes and enable settings for that component. The following discussions describe the function of each of components 201–205.

Texture Address Unit and Texture Filter Unit

The texture address unit 201 generates texture addresses for use in subsequent filtering and blending operations. The output of this component is coupled to the texture filter unit 202. The texture filter unit 202 receives the texture coordinates from the texture address unit 201 and samples a current texture map. It then filters sampled color values and outputs a single color for that pixel. In the present embodiment, most of the operations in the texture filter unit 202 do not require any multi-passing operation. However, "filter4 mode" is an example of a more complex operation which does require multi-passing.

Referring now to FIG. 3, table 1 in accordance with one embodiment of the present invention which defines a particular control, TFD, TFF, TFR, and TFI, with respect to texture filter color, Ct, and a description of the particular operation performed during each of 4 passes (e.g., 4 rows of table 1). For example, as shown in table 1, initially, Ct is undefined and texture filter unit 202 is disabled. During the first pass, Texels[s,t,r] are filtered with Ct to accomplish the first pass of the filter4 operation. During the second pass Texels[s,t,r]+Ctr are filtered. During the final pass, Ctr is passed to the output of texture filter unit 202 and on to texture environment unit 203.

FIG. 4 shows table 2 defining the control for input to the texture filter unit recirculation pipe 210. The control TFCT and TFCTR are the control settings of multiplexer 220 which controls the recirculation of data.

Texture Environment Unit

FIG. 5 shows the table 3 which defines the data path and defines controls for the texture environment unit 203. Texture environment unit 203 combines the color from the texture filter unit, Ct, with a fragment color according to texture environment modes settings. These modes are described in the well known, industry standard OpenGL specification. For multi-passing operations, texture environment unit 203 also needs to combine the input from the recirculation pipe 211 with the texture filter color Ct. Table 3 shows the data path and defines the controls (e.g., TED, TEF, TER, and TEI) for this unit.

The TED and TEF controls are used in the normal single pass modes. The TER pass is used when multiple color pass modes are defined. This pass combines the color from a previous texture with the current texture. The TEI pass is used when the texture color is needed in later passes of per-pixel lighting unit 204.

In the present embodiment, the control is set using 2 enable bits. The <OP> value is set by texture environment mode command "token". The enable bits are set on every pass. The texture environment mode is set when a texture changes.

FIG. 6 shows table 4 which defines the controls of multiplexer 221 which controls the flow of data through recirculation pipe 211. The TECTE control is used whenever a new color is computed in the texture environment unit 203. The TECTER control is used when the texture environment unit 203 is idle and the current color is just recirculated.

Per-Pixel Lighting Unit

FIG. 7 shows table 5 which defines the controls for per-pixel lighting unit 204. Per-pixel lighting unit 204 computes a color based upon a per-pixel lighting equation. This unit has one 8 bit recirculation pipe 212. Recirculation pipe 212 recirculates the results of an 'attenuation' pass. The attenuation pass is used for computing spotlight attenuation.

Per-pixel lighting unit 204 receives two 'colors' from previous units, Cte and Cter. These colors are used depending upon the modes set by a "light_texture" extension. Per-pixel unit 204 is controlled by mode settings for each light. In the present embodiment, application software selects sets light ID per pass in a multi-pass operation. Each pass can render one light.

The fragment light color material uses the pre-texture fragment color as the material color. The material color can come from three sources: pre-texture fragment color, post-texture-environment color, or the texture-environment recirculation color. In the present embodiment, the selection of material color is based upon controls defined in following two OpenGL extensions: Fragment_lighting.spec and light_texture.spec.

Light Environment Unit

Referring now to FIG. 8, table 6, defining the controls for the light environment function, is shown. The light environment unit 205 functions by combining the per-pixel light color, Cl, with the texture environment color, Cte. Table 6 shows the data path.

In the present embodiment, the LEF control is used in the single light, single pass case. In multi light/ multi-pass cases, LEF is used for the first light pass, and LER is used for subsequent light passes. Although the light environment function, <OP>, is applied in each pass, the output is generally not valid except in the final light pass (LEF in single light cases, LER in multiple light cases). In the intermediate passes, the light colors are accumulated. Also note that the color of each light is clamped before being added to the next light color in a following pass.

The LEI pass is used in a single/multi light case when either texture filter unit 202 or texture environment unit 203 are recirculating and a new Cte is not available.

It should be noted that a separate specular_color extension has been included in OpenGL 1.1. In accordance with the present invention, this extension allows implementation without per-pixel lighting to add a specular highlight to a textured object. This applies only to vertex lighting. The vertex lighting produces two colors: emissive+ambient+diffuse color and a specular color. These two colors are interpolated separately. The first color is then combined with texture color in the texture environment unit 203. The second, specular color is then added to the result of the texture environment color, Cte.

Additional Examples of Complex Instructions Implemented by Multi-pass

The following operations are examples of complex graphics instructions which, in accordance with the present invention, are implemented using multi-pass.

1. Filter4 mode (described above)
2. Multiple Textures (color texture or Normal Texture for Bump Mapping)
3. Multiple Fragment (i.e. per pixel) lights
4. Spotlights
5. User Clip Planes Each of the above operations, by themselves, cause texture-shader subsystem 133 to go into multi-pass mode. These operations are also orthogonal to each other so that if more than one operation is enabled, they can each be executed independent of the other multi-pass operation. It should be noted that, for efficiency reasons, some passes from different operations may not be combined. The user clip passes do not depend upon any of the texture/shader hardware of components 201–205, so they can be done completely independent of other operations.

Even though the hardware of texture-shader subsystem 133 does not impose any limits on the number of lights or the number of textures, there is limited amount of memory for storing the enables and modes for each light and textures. As a result, in the present embodiment, a limit of 2 active textures and 8 active fragment lights is imposed. Each of the above operations is described in greater detail below.

Filter4 Mode

Referring now to FIG. 9, table 7 describing the controls used in filter4 mode is shown. In accordance with the present embodiment, filter4 mode is defined in the 'texture_filter4' extension to OpenGL 1.1. This is a bi-cubic filter that is applied to 16 texture sample values. The texture environment unit 203 can filter 8 samples in a single pass, so it will take 2 passes in the texture filter unit 202 to do filter4 for one texture. The controls and mode settings for each pass are to be determined in accordance with the particular implementation of the texture-shader subsystem 133. TFF and TFR are as defined in table 1 above.

In the present embodiment, when filter4 is active for a texture, the software will program the above two passes for the texture filter unit 202. While the first pass is active, the texture environment unit 203 and the light environment unit 205 are idle. During the second pass, the texture environment unit 203 and the light environment unit 205 can be setup to do their operations.

Application of Multiple Textures

Referring now to FIG. 11, table 9 describing the pass required for implementing a multi-texture extension is shown. This operation is described in the "multi-texture" extension to OpenGL 1.1. The outputs of multiple texture filter operations are combined in the texture environment unit 202. The active textures can be of two types, color or normal. All color textures are done first. The texture filter color, Ct, from the first color texture is recirculated while the second texture color is computed in the texture filter unit 202. These colors are then combined in the second pass. If the second texture is a Normal texture, then the color from the first texture is still recirculated but it is not combined in with the Normal in the second pass. The per-pixel lighting unit 204 uses both the recirculated value and the texture environment unit output Cte for Normal textures (e.g., bump mapping).

If the texture filter unit 202 is in the first pass of filter4, then the texture environment unit 203 will idle (e.g., it will continue to recirculate the previous color until the texture filter unit 202 is done with its second pass).

Multiple Lights

FIG. 12 shows table 10, which describes the passes required for implementing multiple lights. This operation is described in the "fragment lighting" extension to OpenGL 1.1. The per-pixel lighting unit 204 computes the color due to a single light and the light environment unit 205 combines the colors from multiple lights. Per-pixel lighting unit 204 also uses the Normal Texture output to do Bump Mapping. When lighting is used in conjunction with textures, the material color can come from the texture color.

In the present embodiment, multiple light passes can follow texture passes if bump mapping is not enabled. This means that first all texture passes are completed and the final texture color is held in the recirculating pipe 211 of texture environment unit 203. Then all lighting passes are completed. For each lighting pass, the texture environment unit 203 is set in idle mode where it can supply the texture color of the pixel.

When bump mapping is enabled, the above scheme is not possible. This is because bump mapping requires color and normal. In the present embodiment, only the color can be recirculated. So in this case, each lighting pass is preceded by all the texture passes.

Spot Lights

FIG. 13 shows table 11 which describes the passes required to implement per-pixel spot lights. The per-pixel spotlights computation is done in the per-pixel lighting unit 204 using the same hardware as the specular highlights. The result of spotlight computation is an attenuation term that is applied to the lighting color. As shown in table 11, the attenuation is computed in first pass and the attenuation values are used in the second pass when the colors are computed.

Separate Specular Color

FIG. 14 shows table 12 describing the passes required for implementing a separate specular color from the vertex lighting. The separate specular color from vertex lighting can be added to the texture environment color in two passes. In the first pass, combine texture color with interpolated color (emis+amb+diff). In the second pass, set mode bits, set texture environment, set texture environment bias, and add texture environment color from first pass with interpolated color, as shown in table 12.

User Clip Planes

In the present embodiment, the user clip planes are part of core OpenGL 1.1 finctionality. The user clip planes are evaluated in a separate block in the rasterization subsystem 133. The user clip plane use the same interpolators are texture coordinates so this pass can not be combined with a texture pass. In each pass, the texture-shader subsystem 133 can compute clip check for 3 user clip planes. There are a total of 6 clip planes so it will take at most 2 user clip passes. The result of the clip check is used to set the coverage mask of the pixel. This coverage mask recirculates in its own attribute pipe which is of the same length as the texture filter unit 202, texture environment unit 203, and light environment unit 205 recirculation pipes 210–213.

For efficiency reasons (i.e. clipped pixels do not cause texture faults), the user clip passes are done before any other passes. When user clip passes are active, the texture filter unit 202, texture environment unit 203, and light environment unit 205 are disabled.

Programming Examples

Described below are programming examples for multi-pass operations in accordance with the present invention. In the present embodiment, the programming is the responsibility of the geometry subsystem 131 microcode. The multi-pass operation is started by sending a MP_Begin token to the texture-shader subsystem 133. This is followed by one or more command tokens that set enables and modes in the texture filter unit 202, texture environment unit 203, per-pixel lighting unit 204, and light environment unit 205. Each pass is indicated by a vertex token. At the end of all passes, an MP_End token is sent. All the vertex command tokens between a MP_Begin and MP_End should be of the same type. This entire program is repeated for each vertex. An example is shown below:

```
Begin_MP
    Set Modes (Texture filter, texture environment, light environment)
    Set Enables
    Vertex          // pass 1
    Set Modes
    Set Enables
    Vertex          // pass 2
. . .
. . .
End_MP
```

Since the geometry subsystem 131 microcode does not have any capability to branch on conditions, the entire program is pre-loaded by the OpenGL library into the geometry subsystem program table. The structure of the program closely follows the structure of command stream sent to the raster scan subsystem 132.

The multi-pass program depends upon the currently active multi-pass operations, namely Filter4, Multiple Textures, Multiple Lights, or User Clip Planes. Any of these operation can trigger multi-pass mode. In accordance with the present embodiment, the following rules are used when generating a program for multi-pass operation:
1. Do User Clip plane passes first, if enabled.
2. Do texture passes next.
3. Do lighting passes last.

The texture passes involve both texture filter unit 202 and texture environment unit 203.
1. Do texture filter unit pass if Filter4
2. Do texture environment pass Programming a pass requires determination of what controls to use for texture filter unit 202, texture environment unit 203, and light environment unit 205. In addition, texture filter unit 202 and per-pixel lighting unit 204 may need different mode settings for different texture and light respectively.

Texture-Shader Subsystem Command Tokens

Referring now to FIG. 15A and FIG. 15B, table 13 and table 13, continued, are shown. Table 13 shows the command tokens used by texture-shader subsystem 133 in accordance with one embodiment of the present invention. The tokens and enums (enumerations) are defined for the raster commands to implement multi-passing and fragment lighting.

In addition, the following OpenGL extensions, fragment lighting.spec, light_texture.spec, and multitexture.spec, are relevant for multi-passing operations in accordance with the present invention. These extensions are incorporated herein by reference.

Additional descriptions and discussion of complex algorithms implemented using multi-pass can be found in the following US Patent Applications, which are each incorporated herein by reference:

U.S. patent application Ser. No. 09/096,538 "A METHOD AND APPARATUS USED FOR COMPUTING FAST FOURIER TRANSFORMS (FFT)" by Gosset et al., filed Jun. 12, 1998, which describes signal processing for implementing fast Fourier transforms;

U.S. patent application Ser. No. 08/839,035 "A METHOD AND SYSTEM FOR REAL TIME ILLUMINATION OF COMPUTER GENERATED IMAGES" by Gosset et al., filed Apr. 23, 1997 now U.S. Pat. No. 6,175,367, which discusses multi-passing for lighting of the textures; and U.S. patent application Ser. No. 08/956,537 "METHOD AND APPARATUS FOR PROVIDING IMAGE AND GRAPHICS PROCESSING USING A GRAPHICS RENDERING ENGINE" by Gosset et al., filed Oct. 23, 1997, which discusses convolution and imaging FFTs using multi-pass.

Figure 16:
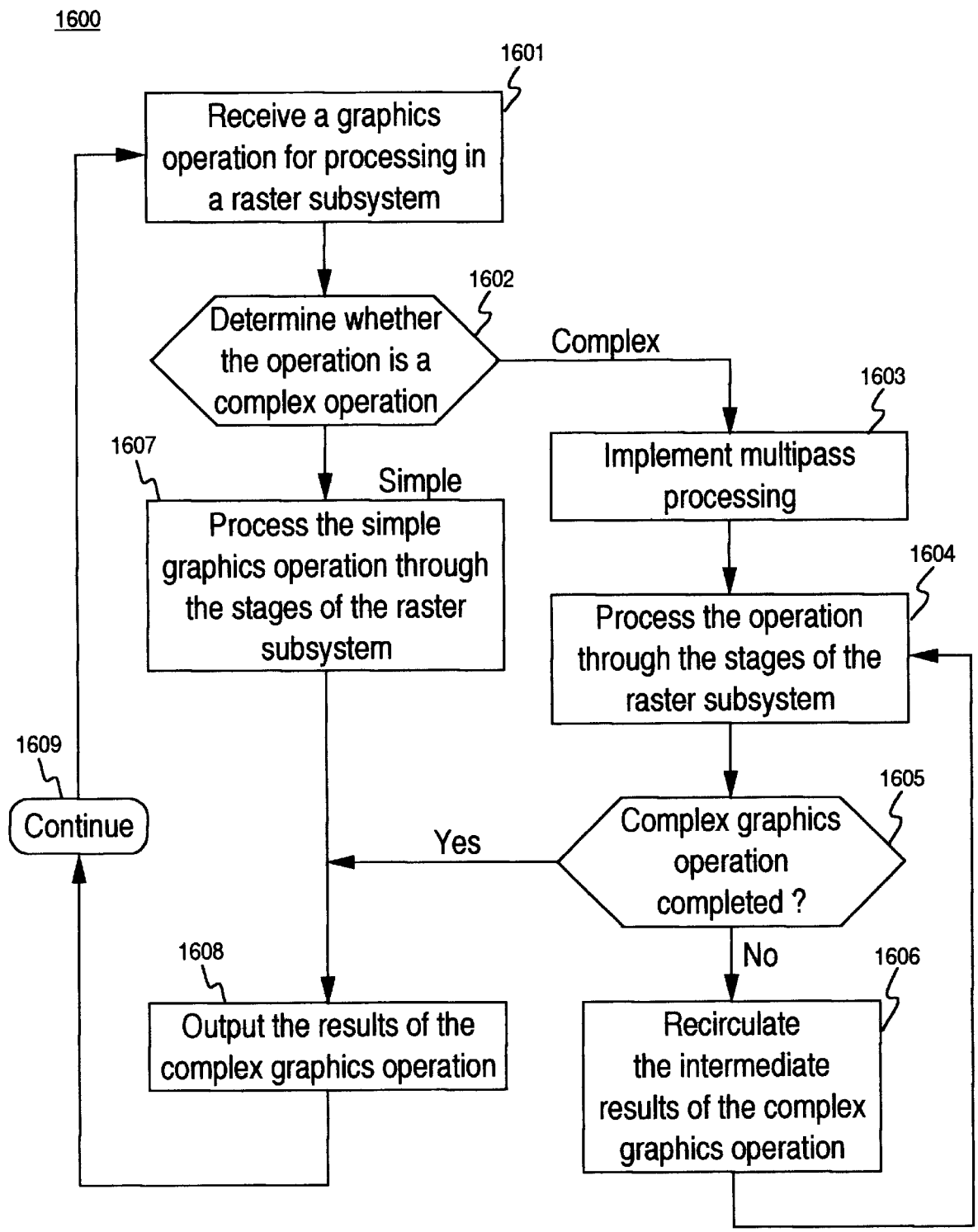
FIG. 16 shows a flow chart of the steps of an operating process in accordance with one embodiment of the present invention.

FIG. 16 shows a flow chart of the steps of a process 1600 in accordance with one embodiment of the present invention. Process 1600 is an operating process of one subsystem, such as, for example texture-shader subsystem 133 from FIG. 2, of a graphics computer system (e.g., computer system 112). Process 1600 depicts the steps performed as graphics operations are received by the texture-shader subsystem and processed.

In step 1601, the texture-shader subsystem receives a graphics operation for processing. As described above, texture-shader subsystem 133 includes a number of deeply pipelined components (e.g., components 201–205 of FIG. 2). To facilitate high data throughput rates, these components each have very high clock frequencies (e.g., 266 Mhz). The components are optimized to process simple graphics operations at maximum speed. In step 1602, the graphics operations are decoded to determine whether they are simple operations or complex operations. As described above, complex operations are implemented through multi-passing. If the operation is complex, process 1600 proceeds to step 1603. If the operation is simple, process 1600 proceeds to step 1607.

In step 1603, to execute the complex graphics operation, multi-pass processing is implemented. Multiplexers within the appropriate components 210–205 are configured as needed to execute the particular operation (e.g., filter4). In step 1604, the operation is processed through the appropriate components of the texture-shader subsystem, as determined by the particular operation. In step 1605, if the operation is not yet complete, the intermediate results of the operation are recirculated through the recirculation pipes of the present invention for further processing, as shown in step 1606. Once the complex graphics operation is complete, process 1600 proceeds to step 1608, where the results of the operation are output to the next subsystem (e.g., display subsystem 134).

Referring still to FIG. 16, in step 1607, where the graphics operation is a simple graphics operation, as determined in step 1602, the operation is process through the stages of the texture-shader subsystem without recirculation. The operation is completely processed in a single pass, at full clock speed. Subsequently, in step 1608, the results of the operation are output to the next subsystem. As shown by step 1609, process 1600 continues, as new graphics operations are received in step 1601.

Thus, the present invention effectively provides for greatly increased graphics subsystem bandwidth. The present invention provides a system which accommodates the enormous bandwidth requirements of the most demanding 3D visualization applications. In addition, the present invention provides a method and system for servicing the bandwidth requirements of the above applications efficiently, without a large amount of redundant logic and its attendant expense. The system of the present invention leverages existing processing hardware of 3D graphics subsystems to improve cost effectiveness. The present invention and its benefits are further described below.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a computer system including a processor coupled to a memory via a bus, a high bandwidth reduced instruction set graphics processing subsystem, comprising:

a graphics processing subsystem configured to accept graphics data from a computer system via a bus, the graphics processing subsystem being pipelined to achieve high bandwidth, the graphics processing subsystem operable for processing a first set of graphics instructions and a second set of graphics instructions, wherein the graphics instructions from the second set are more complex than the graphics instructions from the first set;

a recirculation pipe built into the graphics processing subsystem to enable graphics instructions by multi-pass; and the graphics processing subsystem streamlined to process the first set of graphics instructions efficiently, the graphics processing subsystem configured to process the second set of graphics instructions by using multi-pass via the recirculation pipe, wherein the graphics processing subsystem includes a plurality of components and a corresponding plurality of coupled recirculation pipes, and wherein the plurality of recirculation pipes are of the same length.

2. The system of claim 1, wherein the plurality of components and the corresponding plurality of recirculation pipes are integrated into a single semiconductor die.

3. The system of claim 1, wherein the recirculation pipe includes a multiplexer adapted to configure the recirculation pipe to feed back intermediate results for processing in a subsequent pass.

4. The system of claim 1, wherein the recirculation pipe is adapted to recirculate results to compensate for a stall in the graphics processing subsystem due to a cache fault.

5. The system of claim 1, wherein the graphics processing subsystem is a texture-shader.

6. In a computer system including a processor coupled to a memory via a bus, a high bandwidth reduced instruction set graphics processing subsystem, comprising:

a texture-shader configured to accept graphics data from a computer system via a bus, the texture-shader being pipelined to achieve high bandwidth, the texture-shader operable for processing a first set of graphics instructions and a second set of graphics instructions, wherein the graphics instructions from the second set are more complex than the graphics instructions from the first set;

an internal recirculation pipe built into the texture-shader to enable graphics instructions by multi-pass; and the texture-shader streamlined to process the first set of graphics instructions efficiently, the texture-shader configured to process the second set of graphics instructions by using multi-pass via the recirculation pipe, wherein the texture-shader includes a plurality of components and a corresponding plurality of coupled recirculation pipes, and wherein the plurality of recirculation pipes are of the same length.

7. The system of claim 6, wherein the plurality of components and the corresponding plurality of recirculation pipes are integrated into a single semiconductor die.

8. The system of claim 6, wherein the recirculation pipe includes a multiplexer adapted to configure the recirculation pipe to feed back intermediate results for processing in a subsequent pass.

9. The system of claim 6, wherein the recirculation pipe is adapted to recirculate results to compensate for a stall in the graphics processing subsystem due to a cache fault.

10. The system of claim 6 wherein multi-pass processing via the recirculation pipe enables the texture-shader to process complex instructions from the second set without using a microprocessor.

11. In a computer system including a processor coupled to a memory via a bus, a method processing using a high bandwidth reduced instruction set graphics processing subsystem, the method comprising the steps of:

accepting graphics data from a computer system via a bus using a graphics processing subsystem pipelined to achieve high bandwidth;

processing a first set of graphics instructions using the graphics processing subsystem;

processing a second set of graphics instructions using the graphics processing subsystem, wherein the graphics instructions from the second set are more complex than the graphics instructions from the first set;

enabling multi-pass processing by using a recirculation pipe built into the graphics processing subsystem;

processing the first set of graphics instructions in a single pass, wherein the hardware of the graphics processing subsystem is configured to optimally process graphics instructions from the first set; and processing the second set of graphics instructions by using multi-pass via the recirculation pipe, wherein the graphics processing subsystem includes a plurality of components and a corresponding plurality of coupled recirculation pipes, and wherein the plurality of recirculation pipes are of the same length.

12. The method of claim 11, wherein the plurality of components and the corresponding plurality of recirculation pipes are integrated into a single semiconductor die.

13. The method of claim 11, wherein the recirculation pipe includes a multiplexer adapted to configure the recirculation pipe to feed back intermediate results for processing in a subsequent pass.

14. The method of claim 11, wherein the recirculation pipe is adapted to recirculate results to compensate for a stall in the graphics processing subsystem due to a cache fault.

15. The method of claim 11, wherein the graphics processing subsystem is a texture-shader.

16. In a computer system including a processor coupled to a memory via a bus, a high bandwidth reduced instruction set graphics processing subsystem adapted to process both graphics instructions and imaging instructions, comprising:

a graphics processing subsystem configured to accept graphics data from a computer system via a bus, the graphics processing subsystem being pipelined to achieve high bandwidth, the graphics processing subsystem operable for processing a set of graphics instructions and a set of imaging instructions, wherein the set of imaging instructions are more complex than the set of graphics instructions;

a recirculation pipe built into the graphics processing subsystem to enable imaging instructions by multi-pass; and the graphics processing subsystem streamlined to process the set of graphics instructions efficiently, the graphics processing subsystem configured to process the set of imaging instructions by using multi-pass via the recirculation pipe, wherein the graphics processing subsystem includes a plurality of components and a corresponding plurality of coupled recirculation pipes, and wherein the plurality of recirculation pipes are of the same length.

17. The system of claim 16, wherein the plurality of components and the corresponding plurality of recirculation pipes are integrated into a single semiconductor die.

* * * * *